(12) United States Patent
Kandel et al.

(10) Patent No.: US 11,977,882 B2
(45) Date of Patent: May 7, 2024

(54) SYSTEM AND METHOD IMPLEMENTING A DESIGN SYSTEM REVIEW TOOL

(71) Applicant: JPMorgan Chase Bank, N.A., New York, NY (US)

(72) Inventors: Stacy Newman Kandel, Easton, PA (US); Jay Jagpal, Glasgow (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 65 days.

(21) Appl. No.: 17/660,507

(22) Filed: Apr. 25, 2022

(65) Prior Publication Data

US 2023/0342145 A1   Oct. 26, 2023

(51) Int. Cl.
*G06F 8/77* (2018.01)
*G06N 20/00* (2019.01)

(52) U.S. Cl.
CPC .............. *G06F 8/77* (2013.01); *G06N 20/00* (2019.01)

(58) Field of Classification Search
CPC .................................. G06F 8/77; G06N 20/00
USPC .............................. 717/101–121; 706/45–60
See application file for complete search history.

(56) References Cited

U.S. PATENT DOCUMENTS

| | | | | |
|---|---|---|---|---|
| 5,587,935 A * | 12/1996 | Brooks | ...................... | G06F 8/10 703/2 |
| 6,370,681 B1 * | 4/2002 | Dellarocas | ................ | G06F 8/20 717/136 |
| 6,625,500 B1 * | 9/2003 | Li | ........................ | G05B 13/021 706/45 |
| 6,629,081 B1 * | 9/2003 | Cornelius | .............. | G06Q 20/04 705/30 |
| 7,379,926 B1 * | 5/2008 | Belniak | .................... | G06N 5/00 706/14 |
| 7,624,074 B2 * | 11/2009 | Weston | .................. | G06N 20/00 706/1 |

(Continued)

OTHER PUBLICATIONS

Patel et al., "Investigating Statistical Machine Learning as a Tool for Software Development", ACM, pp. 667-676 (Year: 2008).*

(Continued)

*Primary Examiner* — Anil Khatri
(74) *Attorney, Agent, or Firm* — GREENBLUM & BERNSTEIN, P.L.C.

(57) ABSTRACT

Various methods, apparatuses/systems, and media for checking the implementation of the design systems/tool kits in application development are disclosed. A processor accesses a database that stores statistical data corresponding to implementing a new application or feature enhancement into a current application; scans an endpoint and collect corresponding statistical data from the database; generates feedback data based on the collected corresponding statistical data regarding implementing the new application or feature enhancement into a current application; creates a machine learning model configured to be trained to output decision data based on the generated feedback data; trains the machine learning model with the decision data; and generates a score by utilizing the trained machine learning model. The score is a value that is compared by the processor with a predetermined threshold value to determine a degree of readiness to implement the new application or to implement the feature enhancement into the current application.

20 Claims, 5 Drawing Sheets

(56) References Cited

U.S. PATENT DOCUMENTS

| | | | | |
|---|---|---|---|---|
| 7,813,822 | B1* | 10/2010 | Hoffberg | H04N 7/163 381/73.1 |
| 8,001,519 | B2* | 8/2011 | Conallen | G06F 8/316 717/109 |
| 8,527,523 | B1* | 9/2013 | Ravid | G06F 16/951 706/54 |
| 11,455,168 | B1* | 9/2022 | Potyraj | G06F 9/3005 |
| 11,614,922 | B2* | 3/2023 | Brown | G06F 8/315 717/109 |
| 11,615,271 | B2* | 3/2023 | Zion | G06Q 40/08 706/12 |
| 11,681,505 | B2* | 6/2023 | Mukherjee | G06N 20/00 717/107 |
| 11,734,937 | B1* | 8/2023 | Pushkin | G06N 20/20 706/12 |
| 11,782,689 | B1* | 10/2023 | Costello | H04L 41/122 717/177 |

OTHER PUBLICATIONS

Cataldo et al., "Camel: A Tool for Collaborative Distributed Software Design", IEEE, pp. 83-92 (Year: 2009).*

Sei et al., "Machine Learning Model Generation With Copula-Based Synthetic Dataset for Local Differentially Private Numerical Data", IEEE, pp. 101656-101671 (Year: 2022).*

Silva et al., "Machine Learning Model to Classify the Feature Model Maintainability", ACM, pp. 1-11 (Year: 2021).*

Santos et al., "On Using Decision Tree Coverage Criteria for Testing Machine Learning Models", ACM, pp. 1-9 (Year: 2021).*

Gehlot et al., "Application of Neural Network in the Prediction Models of Machine Learning Based Design", IEEE, pp. 1-6 (Year: 2022).*

* cited by examiner

SYSTEM AND METHOD IMPLEMENTING A DESIGN SYSTEM REVIEW TOOL

TECHNICAL FIELD

This disclosure generally relates to application development, and, more particularly, to methods and apparatuses for implementing a platform and language agnostic design system review module/tool/device configured to check the implementation of the design systems or tool kits in application development.

BACKGROUND

The developments described in this section are known to the inventors. However, unless otherwise indicated, it should not be assumed that any of the developments described in this section qualify as prior art merely by virtue of their inclusion in this section, or that these developments are known to a person of ordinary skill in the art.

Today, across the multiple lines of businesses (LOB) at an organization, user interface (UI) developers may be assigned stories or tasks to build or extend features and/or functionality on applications that may considered to be legacy or running incorrect or outdated components or versions of a specified design toolkit. In many cases, the cost to create or extend these applications, using antiquated technologies and components, may prove to be considerably high from a support and maintenance standpoint. It may also allow for variation within the implementation of the UI based on each developer's familiarity with UI technologies and usage of the LOB toolkit, creating inconsistent ecosystems within the user experience. Traditionally, an application development team may continuously work on patching and adding on to outdated UI frameworks and incorrect component libraries. With continuing to develop on incorrect toolkits and/or outdated technologies, the application development team may experience performance derogation of an application; the system may experience vulnerabilities in the security of the application; and the organization may drive up costs to support and maintain these inconsistent and/or legacy application programs.

In addition, in many teams, developers may not feel empowered to make decisions to improve overall efficiencies in the software development life cycle (SDLC). It may be desired that teams should be looking at ways to be more effective by looking to improve process and technologies that would be easier to support, extend and integrate with toolkit libraries and better meet Americans Disabilities Act (ADA) requirements. Without making needed changes in a tech stack, an organization may continue to create tech debt every day that may add more complexities and issues to current applications. This may prove to make these applications more difficult to maintain and hold developers back from learning new skills to keep them relevant in this rapidly changing technology arena.

Therefore, there is a need for an advanced tool that can address these conventional shortcomings.

SUMMARY

The present disclosure, through one or more of its various aspects, embodiments, and/or specific features or sub-components, provides, among other features, various systems, servers, devices, methods, media, programs, and platforms for implementing a platform and language agnostic design system review module/tool/device configured to check the implementation of the design systems/tool kits in application development, but the disclosure is not limited thereto. For example, today, there appears to be many deliveries of applications that are not using the libraries correctly or not using the libraries at all. Also, there appears to be no way to track consistency in applications in production today which may lead to developers having no true guardrails on what is being released into production. By implementing the design system review module/tool/device as disclosed herein, the developed applications may prove to be more compliant from an accessibility perspective (i.e., enabling as many users as possible to use development sites (i.e., Web sites) in application developments, even when those users' abilities are limited in some way), and have more consistency throughout applications to ensure a more consistent ecosystem across technological field (i.e., LOB), but the disclosure is not limited thereto.

According to exemplary embodiments, the design system review module/tool/device as disclosed herein may relate to a UI usage of UI frameworks, accessibility, and design system libraries for implementing an application utilizing advanced UI technologies and Web Content Accessibility Guidelines (WCAG) 2.1 accessibility baseline. The design system review module/tool/device as disclosed herein may also be configured to obtain feedback data regarding implementing a new application or feature enhancement into a current application, thereby improving functionality, consistency, efficiency (via support and maintenance) and accessibility of the application to its surrounding ecosystem, but the disclosure is not limited thereto.

According to an aspect of the present disclosure, a method for implementing a design system review tool by utilizing one or more processors along with allocated memory is disclosed. The method may include: accessing a database that stores statistical data corresponding to implementing a new application or feature enhancement into a current application; scanning an endpoint and collect corresponding statistical data from the database; generating feedback data based on the collected corresponding statistical data regarding implementing the new application or feature enhancement into a current application; creating a machine learning model configured to be trained to output decision data based on the generated feedback data; training the machine learning model with the decision data; and generating a score by utilizing the trained machine learning model, wherein the score is a value that is compared with a predetermined threshold value to determine a degree of readiness to implement the new application or to implement the feature enhancement into the current application.

According to a further aspect of the present disclosure, the statistical data may include one or more of the following data: lines of code, frameworks, number of components used, and accessibility requirements, but the disclosure is not limited thereto.

According to another aspect of the present disclosure, the method may further include: generating the score for implementation of the current application based on the application's implementation of the accessibility requirements.

According to yet another aspect of the present disclosure, the matrix data may include data corresponding to components used data, frameworks implementation efforts data and toolkit versioning data, but the disclosure is not limited thereto.

According to an aspect of the present disclosure, the method may further include: implementing a browse function configured to point to said endpoint to scan for the toolkit versioning data utilized to develop the new application or to implement the feature enhancement into the current application.

According to a further aspect of the present disclosure, the method may further include: implementing the browse function to point tools at a corresponding library; scanning source codes, by utilizing a tool, from the library associated with the development of the new application or the feature enhancement into the current application; comparing the scanned source codes against rules or success criteria that have been loaded into the tool; and growing the criteria through implementing the machine learning model to account for more matches.

According to a further aspect of the present disclosure, the endpoint may be a computing device utilized by a user of the new application or the current application.

According to another aspect of the present disclosure, the method may further include: generating a weighted value of the score based on factors of toolkit usage and versioning, framework versioning and components' implementation.

According to yet another aspect of the present disclosure, for any score that is below the predetermined threshold value and requiring fixing, the method may further include: highlighting the problem areas associated with the development of the new application or the feature enhancement into the current application with a recommendation on how to fix the score.

According to an aspect of the present disclosure, the method may further include: calling out the toolkit, framework, accessibility requirements, and components that is not meeting the predetermined threshold value corresponding to a predefined production or deployment success criteria.

According to a further aspect of the present disclosure, the method may further include: fixing the highlighted problem areas; and rescanning the endpoint to obtain an approved score that meets the predetermined threshold value.

According to another aspect of the present disclosure, for any score that is equal to or above the predetermined threshold value, the method may further include: highlighting additional recommendations to improve the score and make additional changes to the new application or the feature enhancement into the current application to improve performance.

According to an aspect of the present disclosure, a system for implementing a design system review is disclosed. The system may include: a processor; and a memory operatively connected to the processor via a communication interface, the memory storing computer readable instructions, when executed, may cause the processor to: access a database that stores statistical data corresponding to implementing a new application or feature enhancement into a current application; scan an endpoint and collect corresponding statistical data from the database; generate feedback data based on the collected corresponding statistical data regarding implementing the new application or feature enhancement into a current application; create a machine learning model configured to be trained to output decision data based on the generated feedback data; train the machine learning model with the decision data; and generate a score by utilizing the trained machine learning model, wherein the score is a value that is compared with a predetermined threshold value to determine a degree of readiness to implement the new application or to implement the feature enhancement into the current application.

According to another aspect of the present disclosure, the processor may be configured to: generate the score for implementation of the current application based on the application's implementation of the accessibility requirements.

According to an aspect of the present disclosure, the processor may be configured to: implement a browse function configured to point to said endpoint to scan for the toolkit versioning data utilized to develop the new application or to implement the feature enhancement into the current application.

According to a further aspect of the present disclosure, the processor may be configured to: implement the browse function to point tools at a corresponding library; scan source codes, by utilizing a tool, from the library associated with the development of the new application or the feature enhancement into the current application; compare the scanned source codes against rules or success criteria that have been loaded into the tool; and grow the criteria through implementing the machine learning model to account for more matches.

According to another aspect of the present disclosure, the processor may be configured to: generate a weighted value of the score based on factors of toolkit usage and versioning, framework versioning and components' implementation.

According to yet another aspect of the present disclosure, for any score that is below the predetermined threshold value and requiring fixing, the processor may be configured to: highlight the problem areas associated with the development of the new application or the feature enhancement into the current application with a recommendation on how to fix the score.

According to an aspect of the present disclosure, the processor may be configured to: call out the toolkit, framework, accessibility requirements, and components that is not meeting the predetermined threshold value corresponding to a predefined production or deployment success criteria.

According to a further aspect of the present disclosure, the processor may be configured to: fix the highlighted problem areas; and rescan the endpoint to obtain an approved score that meets the predetermined threshold value.

According to another aspect of the present disclosure, for any score that is equal to or above the predetermined threshold value, the processor may be configured to: highlight additional recommendations to improve the score and make additional changes to the new application or the feature enhancement into the current application to improve performance.

According to an aspect of the present disclosure, non-transitory computer readable medium configured to store instructions for implementing a design system review tool is disclosed. The instructions, when executed, may cause a processor to perform the following: accessing a database that stores statistical data corresponding to implementing a new application or feature enhancement into a current application; scanning an endpoint and collect corresponding statistical data from the database; generating feedback data based on the collected corresponding statistical data regarding implementing the new application or feature enhancement into a current application; creating a machine learning model configured to be trained to output decision data based on the generated feedback data; training the machine learning model with the decision data; and generating a score by utilizing the trained machine learning model, wherein the score is a value that is compared with a predetermined threshold value to determine a degree of readiness to implement the new application or to implement the feature enhancement into the current application.

According to another aspect of the present disclosure, the instructions, when executed, may further cause the processor to perform the following: generating the score for implementation of the current application based on the application's implementation of the accessibility requirements.

According to an aspect of the present disclosure, the instructions, when executed, may further cause the processor to perform the following: implementing a browse function configured to point to said endpoint to scan for the toolkit versioning data utilized to develop the new application or to implement the feature enhancement into the current application.

According to a further aspect of the present disclosure, the instructions, when executed, may further cause the processor to perform the following: implementing the browse function to point tools at a corresponding library; scanning source codes, by utilizing a tool, from the library associated with the development of the new application or the feature enhancement into the current application; comparing the scanned source codes against rules or success criteria that have been loaded into the tool; and growing the criteria through implementing the machine learning model to account for more matches.

According to another aspect of the present disclosure, the instructions, when executed, may further cause the processor to perform the following: generating a weighted value of the score based on factors of toolkit usage and versioning, framework versioning and components' implementation.

According to yet another aspect of the present disclosure, for any score that is below the predetermined threshold value and requiring fixing, the instructions, when executed, may further cause the processor to perform the following: highlighting the problem areas associated with the development of the new application or the feature enhancement into the current application with a recommendation on how to fix the score.

According to an aspect of the present disclosure, the instructions, when executed, may further cause the processor to perform the following: calling out the toolkit, framework, accessibility requirements, and components that is not meeting the predetermined threshold value corresponding to a predefined production or deployment success criteria.

According to a further aspect of the present disclosure, the instructions, when executed, may further cause the processor to perform the following: fixing the highlighted problem areas; and rescanning the endpoint to obtain an approved score that meets the predetermined threshold value.

According to another aspect of the present disclosure, for any score that is equal to or above the predetermined threshold value, the instructions, when executed, may further cause the processor to perform the following: highlighting additional recommendations to improve the score and make additional changes to the new application or the feature enhancement into the current application to improve performance.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
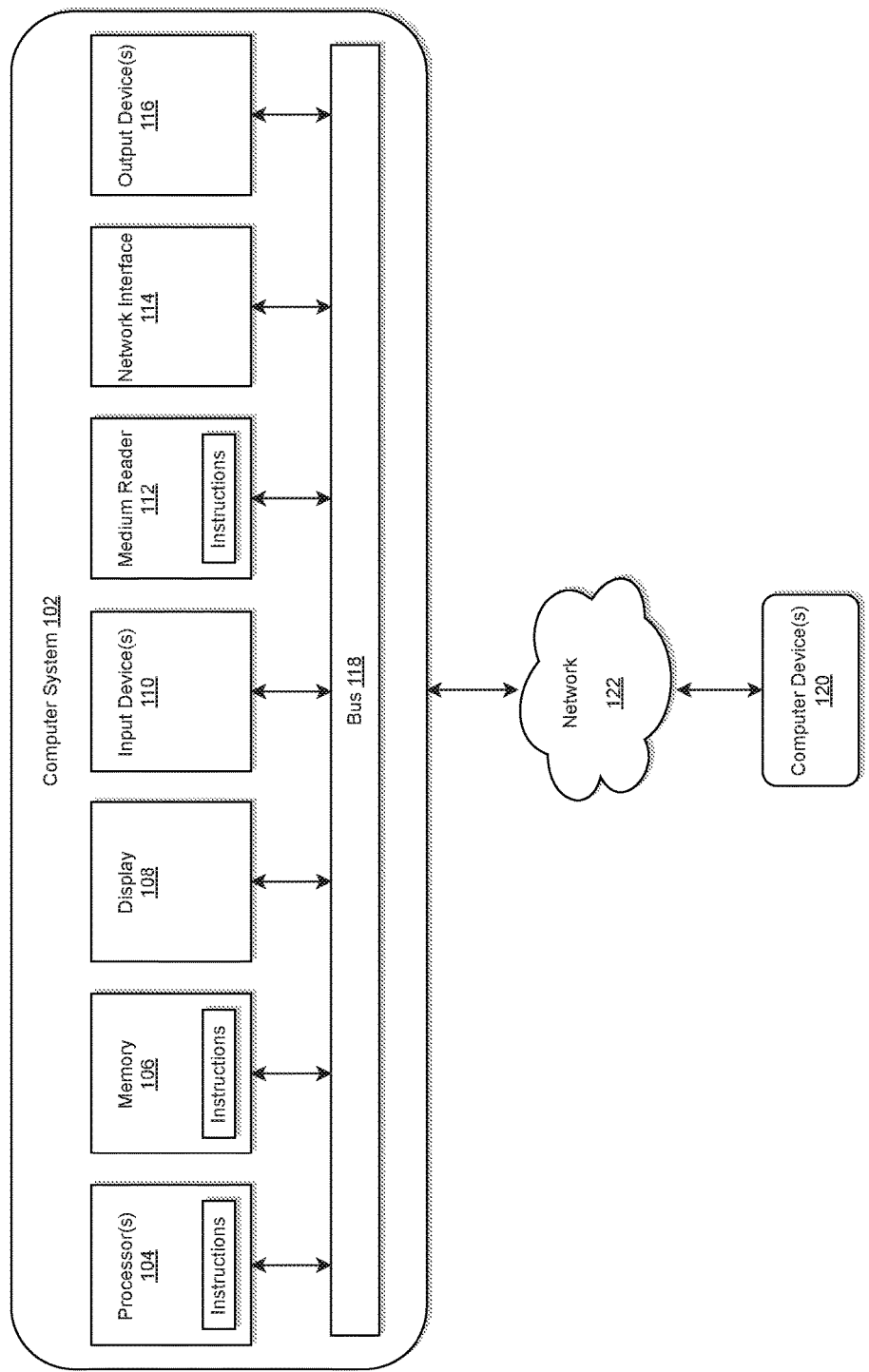
FIG. 1 illustrates a computer system for implementing a platform and language agnostic design system review module configured to automatically check the implementation of the design systems or tool kits in application development in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for implementing a platform and language agnostic design system review module for automatically checking the implementation of the design systems or tool kits in application development and providing recommendations how to improve application development process to in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

The configuration/data files, according to exemplary embodiments, may be written using JAVASCRIPT® Object Notation, but the disclosure is not limited thereto. For example, the configuration/data files can easily be extended to other readable file formats such as XML, YAML, etc., or any other configuration-based languages.

Figure 2:
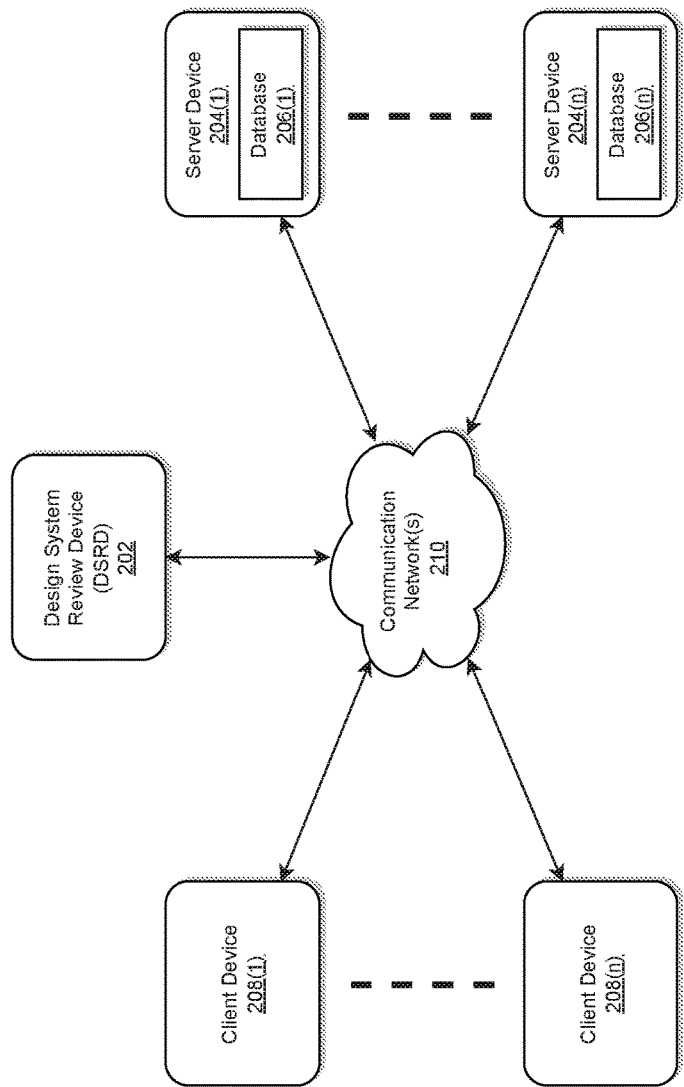
FIG. 2 illustrates an exemplary diagram of a network environment with a platform and language agnostic design system review device in accordance with an exemplary embodiment.

Referring to FIG. 2, a schematic of an exemplary network environment 200 for implementing a platform and language agnostic design system review device (DSRD) to automatically check the implementation of the design systems or tool kits in application development of the instant disclosure is illustrated.

According to exemplary embodiments, the above-described problems associated with conventional approach of checking application development process may be overcome by implementing an DSRD 202 as illustrated in FIG. 2 that may implement a platform and language agnostic design system review module configured to check the implementation of the design systems/tool kits in application development, but the disclosure is not limited thereto. For example, today, there appears to be many deliveries of applications that are not using the libraries correctly or not using the libraries at all. Also, there appears to be no way to track consistency in applications in production today which may lead to developers having no true guardrails on what is being released into production. By implementing the DSRD 202 as illustrated in FIG. 2 that may implement a platform and language agnostic design system review module as disclosed herein, the developed applications may prove to be more compliant from an accessibility perspective (i.e., enabling as many users as possible to use development sites (i.e., Web sites) in application developments, even when those users' abilities are limited in some way), and have more consistency throughout applications to ensure a more consistent ecosystem across technological field (i.e., LOB), but the disclosure is not limited thereto.

According to exemplary embodiments, the DSRD 202 as illustrated in FIG. 2 that may implement a platform and language agnostic design system review module as disclosed herein may relate to a UI usage of UI frameworks, accessibility, and design system libraries for implementing an application utilizing advanced UI technologies and Web Content Accessibility Guidelines (WCAG) 2.1 accessibility baseline. The DSRD 202 as illustrated in FIG. 2 that may implement a platform and language agnostic design system review module as disclosed herein may also be configured to obtain feedback data regarding implementing a new application or feature enhancement into a current application, thereby improving functionality, consistency, efficiency (via support and maintenance) and accessibility of the application to its surrounding ecosystem, but the disclosure is not limited thereto.

The DSRD 202 may be the same or similar to the computer system 102 as described with respect to FIG. 1.

The DSRD 202 may store one or more applications that can include executable instructions that, when executed by the DSRD 202, cause the DSRD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DSRD 202 itself, may be located in virtual server(s) running in a cloud-based computing environment rather than being tied to one or more specific physical network computing devices. Also, the application(s) may be running in one or more virtual machines (VMs) executing on the DSRD 202. Additionally, in one or more embodiments of this technology, virtual machine(s) running on the DSRD 202 may be managed or supervised by a hypervisor.

In the network environment 200 of FIG. 2, the DSRD 202 is coupled to a plurality of server devices 204(1)-204(n) that hosts a plurality of databases 206(1)-206(n), and also to a plurality of client devices 208(1)-208(n) via communication network(s) 210. A communication interface of the DSRD 202, such as the network interface 114 of the computer system 102 of FIG. 1, operatively couples and communicates between the DSRD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DSRD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DSRD 202 may be a standalone device or integrated with one or more other devices or apparatuses, such as one or more of the server devices 204(1)-204(n), for example. In one particular example, the DSRD 202 may be hosted by one of the server devices 204(1)-204(n), and other arrangements are also possible. Moreover, one or more of the devices of the DSRD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DSRD 202 via the communication network(s) 210 according to the HTTP-based and/or JSON JAVASCRIPT® Object Notation protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the DSRD 202 that may efficiently provide a platform for implementing a platform and a language agnostic design system review module/tool/device configured to check the implementation of the design systems/tool kits in application development, but the disclosure is not limited thereto. According to exemplary embodiments, the client devices 208(1)-208(n) in this example may include any type of computing device that can facilitate the implementation of the DSRD 202 that may efficiently provide a platform for implementing a platform and a language agnostic design system review module/tool/device configured to obtain feedback data regarding implementing a new application or feature enhancement into a current application, thereby improving functionality, consistency, efficiency (via support and maintenance) and accessibility of the application to its surrounding ecosystem, but the disclosure is not limited thereto.

The client devices 208(1)-208(n) may run interface applications, such as standard web browsers or standalone client applications, which may provide an interface to communicate with the DSRD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the DSRD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DSRD 202, the server devices 204(1)-204(n), or the client devices 208(1)-208(n), for example, may be configured to operate as virtual instances on the same physical machine. For example, one or more of the DSRD 202, the server devices 204(1)-204(n), or the client devices 208(1)-208(n) may operate on the same physical device rather than as separate devices communicating through communication network(s) 210. Additionally, there may be more or fewer DSRDs 202, server devices 204(1)-204(n), or client devices 208(1)-208(n) than illustrated in FIG. 2. According to exemplary embodiments, the DSRD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
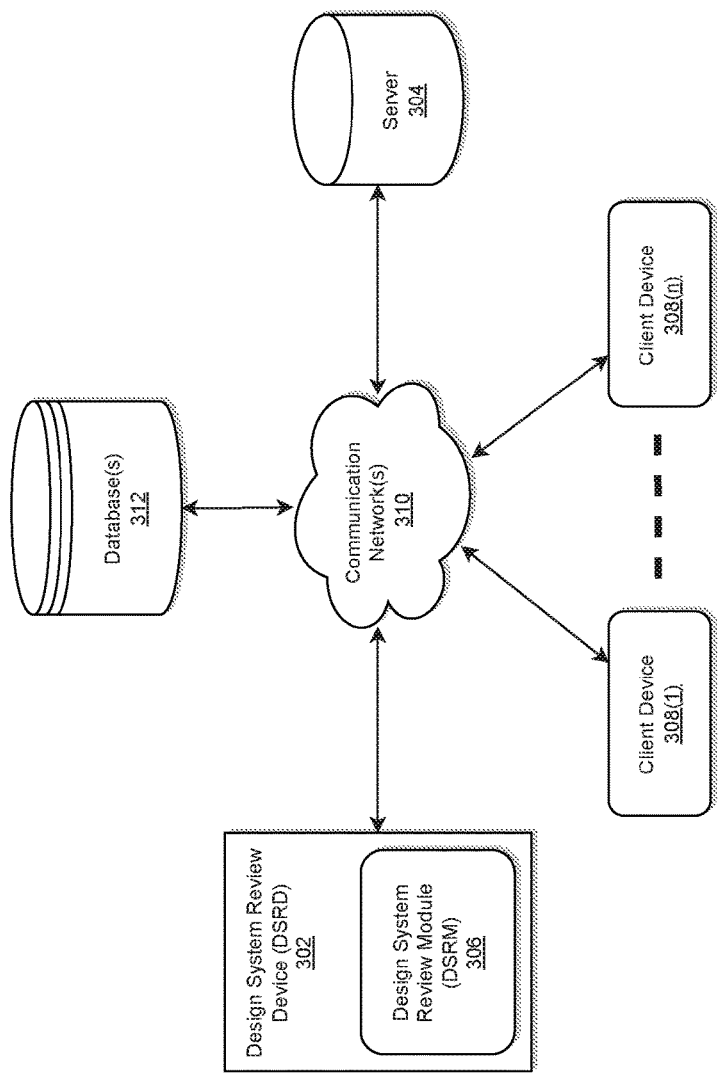
FIG. 3 illustrates a system diagram for implementing a platform and language agnostic design system review device having a platform and language agnostic design system review module in accordance with an exemplary embodiment.

FIG. 3 illustrates a system diagram for implementing a platform and language agnostic DSRD having a platform and language agnostic design system review module (DSRM) in accordance with an exemplary embodiment.

As illustrated in FIG. 3, the system 300 may include an DSRD 302 within which an DSRM 306 is embedded, a server 304, a database(s) 312, a plurality of client devices 308(1) . . . 308(n), and a communication network 310.

According to exemplary embodiments, the DSRD 302 including the DSRM 306 may be connected to the server 304, and the database(s) 312 via the communication network 310. The DSRD 302 may also be connected to the plurality of client devices 308(1) . . . 308(n) via the communication network 310, but the disclosure is not limited thereto.

According to exemplary embodiment, the DSRD 302 is described and shown in FIG. 3 as including the DSRM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein. The database(s) may be a private or public cloud databases (i.e., AWS, S3, etc.), a log database (i.e., Splunk) that may that may produce programming for searching, monitoring, and analyzing machine-generated data via a Web-style interface, etc., but the disclosure is not limited thereto.

According to exemplary embodiments, the DSRM 306 may be configured to receive real-time feed of data from the plurality of client devices 308(1) . . . 308(n) via the communication network 310.

As will be described below, the DSRM 306 may be configured to access a database that stores statistical data corresponding to implementing a new application or feature enhancement into a current application; scan an endpoint and collect corresponding statistical data from the database; generate feedback data based on the collected corresponding statistical data regarding implementing the new application or feature enhancement into a current application; create a machine learning model configured to be trained to output decision data based on the generated feedback data; train the machine learning model with the decision data; and generate a score by utilizing the trained machine learning model, wherein the score is a value that is compared with a predetermined threshold value to determine a degree of readiness to implement the new application or to implement the feature enhancement into the current application, but the disclosure is not limited thereto.

The plurality of client devices 308(1) . . . 308(n) are illustrated as being in communication with the DSRD 302. In this regard, the plurality of client devices 308(1) . . . 308(n) may be "clients" of the DSRD 302 and are described herein as such. Nevertheless, it is to be known and understood that the plurality of client devices 308(1) . . . 308(n) need not necessarily be "clients" of the DSRD 302, or any entity described in association therewith herein. Any additional or alternative relationship may exist between either or both of the plurality of client devices 308(1) . . . 308(n) and the DSRD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the DSRD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The DSRD 302 may be the same or similar to the DSRD 202 as described with respect to FIG. 2, including any features or combination of features described with respect thereto.

Figure 4:
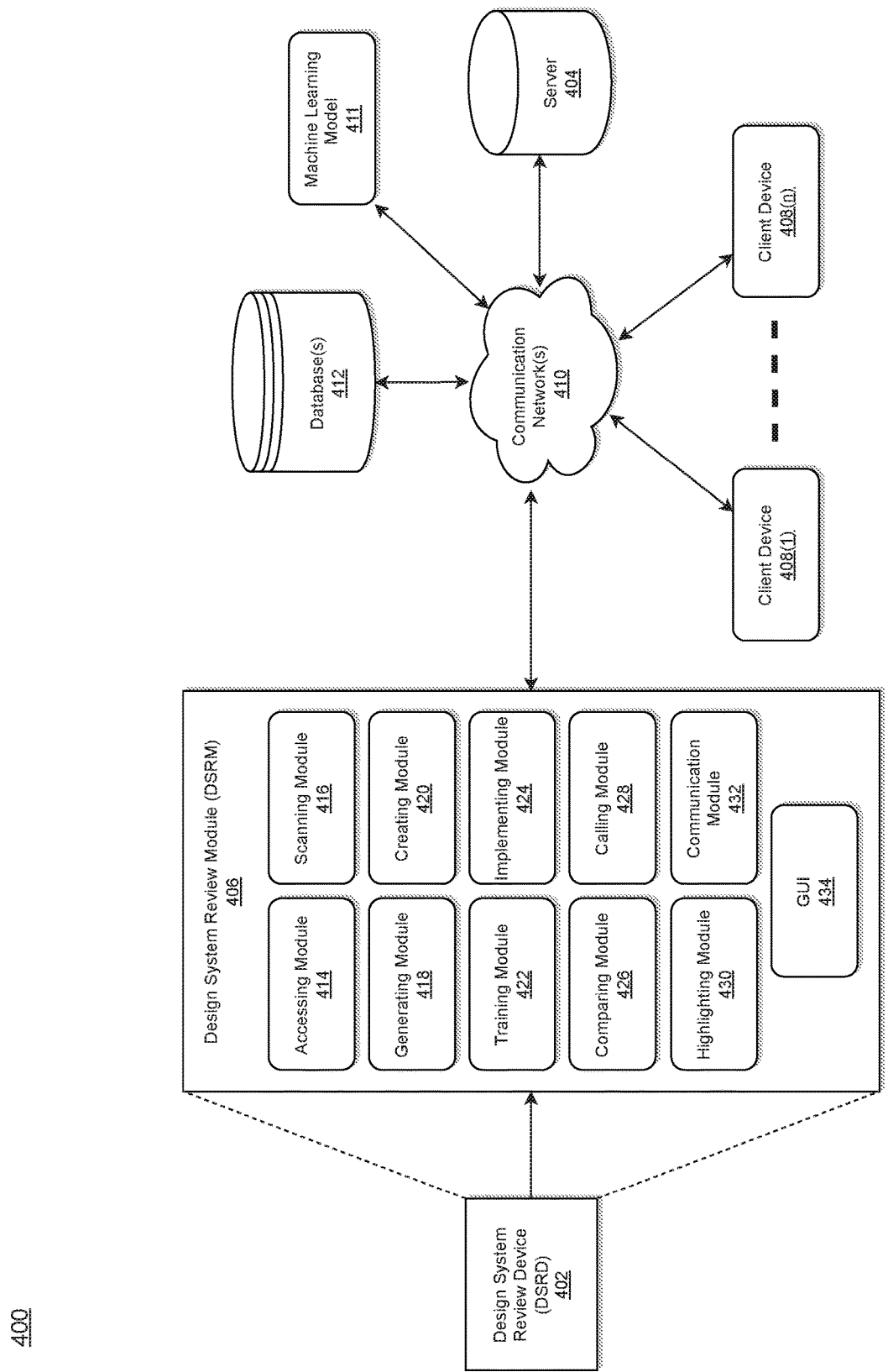
FIG. 4 illustrates a system diagram for implementing a platform and language agnostic design system review module of FIG. 3 in accordance with an exemplary embodiment.

FIG. 4 illustrates a system diagram for implementing a platform and language agnostic DSRM of FIG. 3 in accordance with an exemplary embodiment.

According to exemplary embodiments, the system 400 may include a platform and language agnostic DSRD 402 within which an DSRM 406 is embedded, a server 404, database(s) 412, a machine learning model 411, and a communication network 410.

According to exemplary embodiments, the DSRD 402 including the DSRM 406 may be connected to the server 404, the machine learning model 411, and the database(s) 412 via the communication network 410. The DSRD 402 may also be connected to the plurality of client devices 408(1)-408(n) via the communication network 410, but the disclosure is not limited thereto. The DSRM 406, the server 404, the plurality of client devices 408(1)-408(n), the database(s) 412, the communication network 410 as illustrated in FIG. 4 may be the same or similar to the DSRM 306, the server 304, the plurality of client devices 308(1)-308(n), the database(s) 312, the communication network 310, respectively, as illustrated in FIG. 3.

According to exemplary embodiments, as illustrated in FIG. 4, the DSRM 406 may include an accessing module 414, a scanning module 416, a generating module 418, a creating module 420, a training module 422, an implementing module 424, a comparing module 426, a calling module 428, a highlighting module 430, a communication module 432, and a graphical user interface (GUI) 434.

According to exemplary embodiments, each of the accessing module 414, scanning module 416, generating module 418, creating module 420, training module 422, implementing module 424, comparing module 426, calling module 428, highlighting module 430, and the communication module 432 of the DSRM 406 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the accessing module 414, scanning module 416, generating module 418, creating module 420, training module 422, implementing module 424, comparing module 426, calling module 428, highlighting module 430, and the communication module 432 of the DSRM 406 may be implemented by microprocessors or similar, and may be programmed using software (e.g., microcode) to perform various functions discussed herein and may optionally be driven by firmware and/or software.

Alternatively, according to exemplary embodiments, each of the accessing module 414, scanning module 416, generating module 418, creating module 420, training module 422, implementing module 424, comparing module 426, calling module 428, highlighting module 430, and the communication module 432 of the DSRM 406 may be implemented by dedicated hardware, or as a combination of dedicated hardware to perform some functions and a processor (e.g., one or more programmed microprocessors and associated circuitry) to perform other functions.

According to exemplary embodiments, each of the accessing module 414, scanning module 416, generating module 418, creating module 420, training module 422, implementing module 424, comparing module 426, calling module 428, highlighting module 430, and the communication module 432 of the DSRM 406 may be called via corresponding API.

The process may be executed via the communication module 432 and the communication network 410, which may comprise plural networks as described above. For example, in an exemplary embodiment, the various components of the DSRM 406 may communicate with the server 404, and the database(s) 412 via the communication module 432 and the communication network 410. Of course, these embodiments are merely exemplary and are not limiting or exhaustive.

According to exemplary embodiments, the communication network 410 and the communication module 432 may be configured to establish a link between the database(s) 412, the client devices 408(1)-408(n) and the DSRM 406.

According to exemplary embodiments, the accessing module 414 may be configured to access the database(s) 412 that stores statistical data corresponding to implementing a new application or feature enhancement into a current application.

According to exemplary embodiments, the scanning module 416 may be configured to scan an endpoint and collect corresponding statistical data from the database(s) 412. The generating module 418 may be configured to generate feedback data based on the collected corresponding statistical data regarding implementing the new application or feature enhancement into a current application. The creating module 420 may be configured to create a machine learning model 411 configured to be trained to output decision data based on the generated feedback data.

According to exemplary embodiments, the training module 422 may be configured to train the machine learning model 411 with the decision data; and the generating module 418 may be configured to generate a score by utilizing the trained machine learning model 411. According to exemplary embodiments, the score may be a value that is compared with a predetermined threshold value to determine a degree of readiness to implement the new application or to implement the feature enhancement into the current application. For example, the predetermined threshold value may be 70% corresponding to a degree of readiness to implement the new application, but the disclosure is not limited thereto. For example, the predetermined threshold value may be configured to satisfy any desired degree of readiness percentage, e.g., 75%, 80%, 85%, 90%, 95% etc., but the disclosure is not limited thereto.

According to exemplary embodiments, the generating module 418 may be configured to generate the score for implementation of the current application based on the application's implementation of the accessibility requirements.

According to exemplary embodiments, the implementing module 424 may be configured to implement a browse function configured to point to said endpoint to scan for the toolkit versioning data utilized to develop the new application or to implement the feature enhancement into the current application.

According to exemplary embodiments, the implementing module 424 may be configured to implement the browse function to point tools at a corresponding library; the scanning module 416 may be configured to scan source codes, by utilizing a tool, from the library associated with the development of the new application or the feature enhancement into the current application; the comparing module 416 may be configured to compare the scanned source codes against rules or success criteria that have been loaded into the tool; and the implementing module 424 may be configured to grow the criteria through implementing the machine learning model 411 to account for more matches.

According to exemplary embodiments, the generating module 418 may be configured to generate a weighted value of the score based on factors of toolkit usage and versioning, framework versioning and components' implementation.

According to exemplary embodiments, for any score that is below the predetermined threshold value and requiring fixing, the highlighting module 430 may be configured to highlight the problem areas associated with the development of the new application or the feature enhancement into the current application with a recommendation on how to fix the score.

According to exemplary embodiments, the calling module 428 may be configured to call out the toolkit, framework, accessibility requirements, and components that is not meeting the predetermined threshold value corresponding to a predefined production or deployment success criteria.

According to exemplary embodiments, the implementing module 424 may be configured to fix the highlighted problem areas; and the scanning module 416 may be configured to rescan the endpoint to obtain an approved score that meets the predetermined threshold value.

According to exemplary embodiments, for any score that is equal to or above the predetermined threshold value, the highlighting module 430 may be configured to highlight additional recommendations to improve the score and make additional changes to the new application or the feature enhancement into the current application to improve performance.

According to exemplary embodiments, the DSRM 406 may employ a code analyzer that would be configured to scan any endpoint and collect statistical data (e.g., lines of code, frameworks, number of components used, ally tags, etc.); a matrix of components, frameworks implementation efforts and toolkit versioning; a browse function configured to point to said endpoint to scan for toolkit versioning; and a machine learning model that may be configured to be trained to infer decision based on received inputs as described. The machine learning model 411 (e.g., GPT-3), may also be configured to be trained to infer a delivery ready score for implementation of a current application based on said application's implementation of accessibility requirements.

According to exemplary embodiments, the ally requirements may include the following, but the disclosure is not limited thereto: Aria tags; Keyboard shortcuts; Alt tags for image descriptions; Screen reader (JAWS and/or NVIDIA) compatibility; High color contrast of hex values; Data visualization with ability to change from color to patterns; Additional baseline ally requirements as predefined.

According to exemplary embodiments, with GPT-n, the model 411 may review the application and provide remediation recommendations that can be, depending on the remediation type, updated into the application source by selecting recommendation for automatic updates where applicable or by using brute force. According to exemplary embodiments, the method for auto-update can be used for UI elements (GUI 434 elements) such as color (Hex values), typography, data visualizations, and in some instances, componentry (such as swapping out Bootstrap components for Material UI common components) when it is a like for like scenario (NG-Grid swapped out with AG-Grid Enterprise) and accessibility updates. Other recommendations for remediation may require manual intervention such as upgrading the UI framework or changing component type. All remediation recommendations may queue the user to whether it can be altered and fixed by the tool or instructions on how the developer can apply a patch or upgrade if recommended for receiving a qualifying score to then migrate to a higher-level environment.

According to exemplary embodiments, the above-described implementations/results may be achieved by utilizing a (pre-trained) transformer such as the machine learning model 411 (i.e., GPT-n series developed by OpenAI). Due to the complexity of the data egress, a pre-trained dataset encompassing sufficient websites may be required for the machine learning tool to deduce what a website is in reference to the heterogenous text and visuals. Furthermore, the utility should simultaneously understand and digest the runtime source-code (compiled), development source-code, visual-layout, user-flow, and rendered 'content'. The machine learning model 411 may likely train multiple mesh transformer JAX similarly to the original Megatron-LM.

To perform this task, the algorithm implemented by the DSRM 406 may consist of a data-parallel autoregressive language model or Mesh Transformer (A megtron) as a 2D mesh of ZeRO models. According to exemplary embodiments, the training sets should include the following, but the disclosure is not limited thereto: all the libraries, docs, source, compilations of the target libraries; every implementation, 'rule' and basic implementation of all attributes within a library; an implementation of those libs in a homogeneous structure; an analysis of existing websites, complete with and without these libraries.

Furthermore, the training sets should be verified against all current "good" and "poor" implementations. It's likely that this may need a model of more than 50 billion parameters. According to exemplary embodiments, the model 411 (i.e., GPT-3 may include about 17 billion parameters. However, this may differ depending on task.

Comparing to other models of this size, the first generation of this algorithm may need approximately 400 billion tokens over a dataset of between 6 million to 100 million websites (the target would be relative to the size/type of the model 411, and the complexity of the website). For example, GPT-Neo offers up to 1.3 billing and 1.7 billion parameters.

To reduce the training requirements of target websites, there is potential to leverage "the Pile", an 825 GiB diverse modelling dataset that consists of 22 smaller, high-quality datasets combined together.

According to exemplary embodiments, conceptually the algorithm implemented by the DSRM 406 analyzes the view, couples each interface item with an associated HTML node element, analyses the feature-set of the target unit, compares that with a known list of understood observations and remediate concurrent issues through automatic manipulation of the runtime source-code, so that it may be recompiled (at development time) into the newly reformatted (updated) developer source code UI component.

During this time, the DSRM 406 may be configured to evaluate/detect the applied library version and upgrade the interface component to utilize the newer features of a library. The DSRM 406 may be further configured to edit the runtime applied HTML, CSS (Cascading Style Sheets) and JS (JavaScript)—providing feedback on changes made.

The interface (i.e., GUI 434) for this utility described herein should present the detected issues, upgrade the issues, commit the source, and provide a solution report to the administer. This should happen for current publicly available open-source libraries. JS includes Vue 2, 3, Angular 16 through 29, React 12 through 17, Jquery 2, 3, (3.6), Ember JS 3, 4, Svelte, Meteor, Express, Bootstrap 3, 4, 5—and any other popular web frameworks (e.g., Next, ExtJS, Electron). Internally the frameworks are less defined as JS/HTML and more so "toolkits" encompassing a multitude of micro challenges for HTML/CSS/JS/JAVA, bundled into one team/brand/name. In compiled environments, the algorithm may understand the JS Subset languages JSX, HTMX, Typescript, Superscript, Coffee script (if required) in an ES5 and ES6 flavor.

Some considerations should be made for Markdown, Markup, RST and other presentation formats as they provide a pre-compile step to runtime distributed (compiled) HTML. In complex deployment environments such as java or python applications, the HTML source files utilize a template library. These may include Jinja, EJS, handlebars, Pug, and Mustache, but the disclosure is not limited thereto. This doesn't include known outliers such as HAML, Pug, Slim due to their base language. According to exemplary embodiments, the algorithm implemented by the DSRM 406 may deduce which of these are applied within the template, understand the associated assets (CSS, JS, extends statements) and resolve all dependencies to manipulate the discovered assets. Once a judgement has been made upon which lines affect a target interface solution, the algorithm implemented by the DSRM 406 alters the source, paying attention to the attributes as they're applied to the incoming component.

For disparate utilities, such as two table rendering libraries may not have matching attributes and the attributes applied to the existing interface unit should be transposed into the replacing entity, ensuring the properties are correctly converted into the target format, in accordance with the concurrent underlying framework and the new (replacing) element. This may need a knowledge mapping of each key property to another associated property in the target library. If there are multiple input and output libraries—the total count of property alterations to the another property map is a count of Cartesian products [*KEY, targets, . . . ] (for all keys). As an example, if this is a one-to-one relation for all (listed) libraries, one can have approximately 300 target parameters without assuming duplicate keys. This should be done through the tree of dependencies, traversing up parents through inspection of any template inline statements the algorithm can read—such as "{% extends 'base.html' %}" and attempting an educated guess as to the real file within the source code (not the runtime code).

According to exemplary embodiments, this is done on all HTML components for the target HTML. However, as many UI applications are dependent upon a visual hierarchy, the changed assets within the source will affect all other HTML files utilizing the changed source. For example, a "contact us" page utilizes the same libraries as the "index" page. The algorithm must recursively inspect any affected file, making all HTML, JS, CSS changes—until all changes are stable across all files. This may be conceptualized similar to the "wave function collapse" algorithm—of all changes on all files are a potential stable state, relative to all other potential stable states.

The algorithm implemented by the DSRM 406 may be taught to understand a list of predefined libraries (and any other desired libraries), how they are integrated within the HTML, and the JS (pre-compiled) source, how they compile, and the visual expectations. The visual alterations should alter both inline CSS and external stylesheets.

According to exemplary embodiments, the DSRM 406 can be accessed and launched via two separate plausible ways; either from desktop-based application or from a browser. The DSRM 406 can be displayed as a new icon on the desktop. The DSRM 406 may utilize a render less browser environment once source is scanned by the scanning module 416 and may extract the data to produce a readout which may prompt a dialog to open and render two versions of application or feature in a split screen window. The screen/window on the left side may render the current state of the UI as deployed; the right screen/window may then show the UI with the system detected abnormalities based off the set of intelligent rules associated with what would be considered ideal state for deployment. According to exemplary embodiments, the user can select from the number of browsers to test their UI and see how implementing said recommendations would impact UI based on the browser that is rendering the application or feature.

According to exemplary embodiments, the readout may also have a score associated with the implementation, including accessibility, that instructs developer if they need to update or can deliver to production as is based on said passing score. The developer can select from the readout recommendations to update the score in order to get a passing result to move to the next environment. The recommendation made for accessibility may be enabled to auto-update when selected, which may automatically kick off a process to fork branch, update ally artifacts and then may be asked to be merged. According to exemplary embodiments, DSRM 406 may be configured to be re-run to generate a new score. Upon receiving a passing score production, DSRM 406 may automatically transmit the score to a development readiness tool as part of the production tollgate process.

Figure 5:
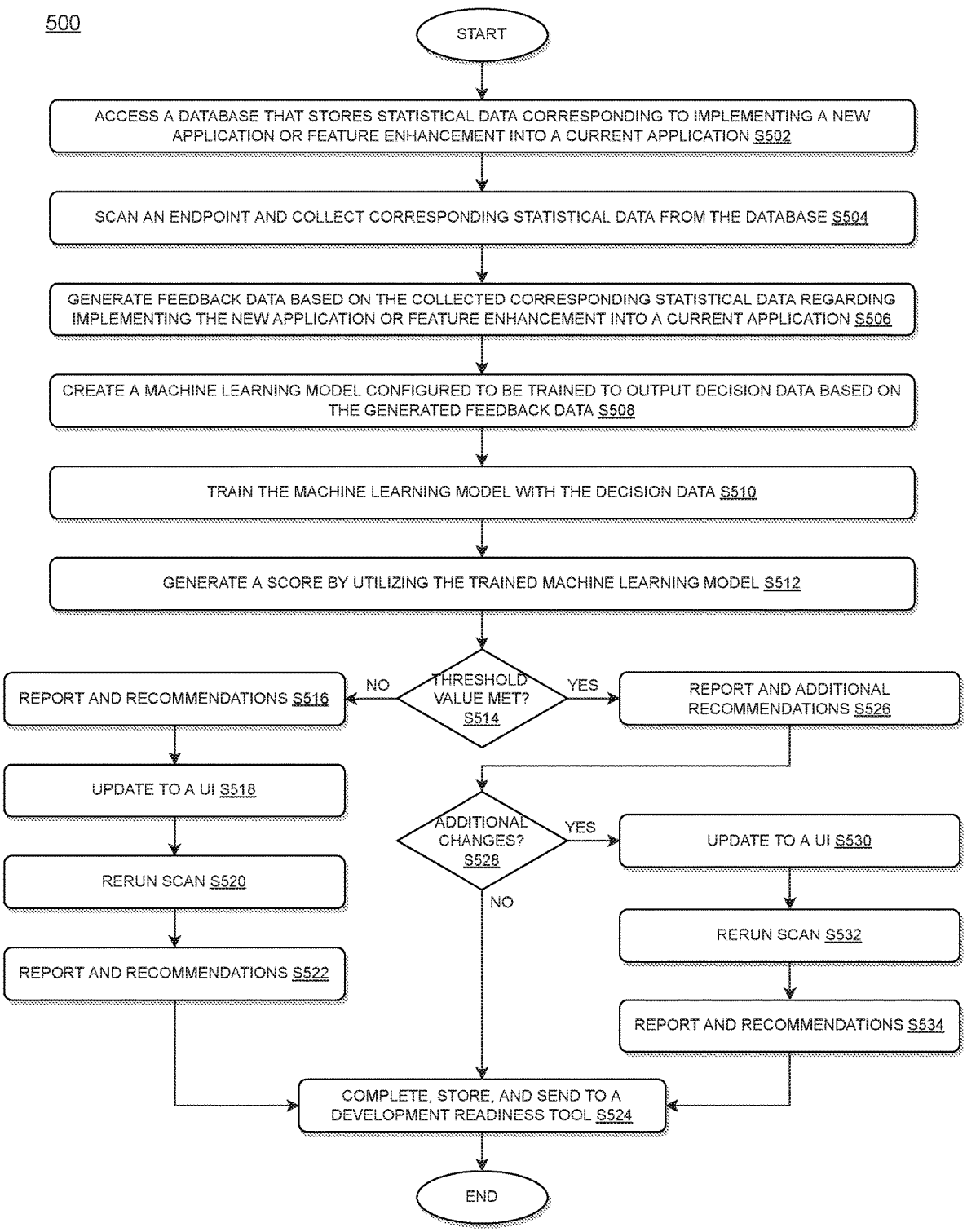
FIG. 5 illustrates a flow chart implemented by the platform and language agnostic design system review module of FIG. 4 for automatically checking the implementation of the design systems or tool kits in application development in accordance with an exemplary embodiment.

FIG. 5 illustrates a flow chart 500 implemented by the platform and language agnostic DSRM 406 of FIG. 4 for automatically checking the implementation of the design systems or tool kits in application development in accordance with an exemplary embodiment. It will be appreciated that the illustrated process 500 and associated steps may be performed in a different order, with illustrated steps omitted, with additional steps added, or with a combination of reordered, combined, omitted, or additional steps.

As illustrated in FIG. 5, the DSRM 406 may be invoked first that will point to bitbucket source (i.e., a database) or highest environment URL (uniform resource locator). For example, at step S502, the process 500 may include accessing a database that stores statistical data corresponding to implementing a new application or feature enhancement into a current application.

At step S504, the process 500 may include scanning an endpoint and collect corresponding statistical data from the database.

At step S506, the process 500 may include generating feedback data based on the collected corresponding statistical data regarding implementing the new application or feature enhancement into a current application.

At step S508, the process 500 may include creating a machine learning model configured to be trained to output decision data based on the generated feedback data.

At step S510, the process 500 may include training the machine learning model with the decision data.

At step S512, the process 500 may include generating a score by utilizing the trained machine learning model, wherein the score is a value that is compared with a predetermined threshold value to determine a degree of readiness to implement the new application or to implement the feature enhancement into the current application.

At step S514, the process 500 may include whether the predetermined threshold value is met or not. For example, when at step S514 it is determined that the threshold value is not met (i.e., the generated score is below the predetermined threshold value), at step S516 a report is generated and recommendations are provided to improve the score to a passing value (i.e., equal to more than the predetermined threshold value); at step S518 a UI is updated with the report and the recommendations; at step S520 the process 500 reruns the scanning step; at step S522 a report and recommendations are generated again after rerun of scanning; and at step S524, the process 500 completes the application development based on the report and recommendations, stores the developed application, and sends the developed application to a development readiness tool.

When at step S514 it is determined that the threshold value is met (i.e., the generated score is equal to or above the predetermined threshold value), at step S526 a report is generated, and recommendations are provided. Based on such report and recommendations, at step S528 it is further determined whether additional changes are recommended to improve the score to more than the predetermined threshold value. For example, if the predetermined threshold value is 70% and the generated score indicates 72% (a passing score), the recommendations may indicate how the score of 72% can be further improved to, for example to 95% or even 100%.

When at step S528, it is determined that additional changes are provided and the user does not want to implement these changes, the process 500 may flow to step S524 where the process 500 completes the application development based on the reports and recommendations without the additional changes, stores the developed application, and sends the developed application to a development readiness tool. However, when at step S528, it is determined that additional changes are provided and the user wants to implement these changes to further improve the score, the process 500 implements steps S530, S532, S534, and S524 sequentially. For example, at step S530, a UI is updated with the report and the recommendations with the additional changes; at step S532 the process 500 reruns the scanning step after implementing the additional changes; at step S534 reports and recommendations are generated again after rerun of scanning; and at step S524, the process 500 completes the application development based on the reports and recommendations with the additional changes, stores the developed application, and sends the developed application to a development readiness tool.

According to exemplary embodiments, the statistical data may include one or more of the following data: lines of code, frameworks, number of components used, and accessibility requirements, but the disclosure is not limited thereto.

According to exemplary embodiments, the process 500 may further include: generating the score for implementation of the current application based on the application's implementation of the accessibility requirements.

According to exemplary embodiments, the matrix data may include data corresponding to components used data, frameworks implementation efforts data and toolkit versioning data, but the disclosure is not limited thereto.

According to exemplary embodiments, the process 500 may further include: implementing a browse function configured to point to said endpoint to scan for the toolkit versioning data utilized to develop the new application or to implement the feature enhancement into the current application.

According to exemplary embodiments, the process 500 may further include: implementing the browse function to point tools at a corresponding library; scanning source codes, by utilizing a tool, from the library associated with the development of the new application or the feature enhancement into the current application; comparing the scanned source codes against rules or success criteria that have been loaded into the tool; and growing the criteria through implementing the machine learning model to account for more matches.

According to exemplary embodiments, the endpoint may be a computing device utilized by a user of the new application or the current application.

According to exemplary embodiments, the process 500 may further include: generating a weighted value of the score based on factors of toolkit usage and versioning, framework versioning and components' implementation.

According to exemplary embodiments, for any score that is below the predetermined threshold value and requiring fixing, the process 500 may further include: highlighting the problem areas associated with the development of the new application or the feature enhancement into the current application with a recommendation on how to fix the score.

According to exemplary embodiments, the process 500 may further include: calling out the toolkit, framework, accessibility requirements, and components that is not meeting the predetermined threshold value corresponding to a predefined production or deployment success criteria.

According to exemplary embodiments, the process 500 may further include: fixing the highlighted problem areas; and rescanning the endpoint to obtain an approved score that meets the predetermined threshold value.

According to exemplary embodiments, for any score that is equal to or above the predetermined threshold value, the process 500 may further include: highlighting additional recommendations to improve the score and make additional changes to the new application or the feature enhancement into the current application to improve performance.

According to exemplary embodiments, the DSRD 402 may include a memory (e.g., a memory 106 as illustrated in FIG. 1) which may be a non-transitory computer readable medium that may be configured to store instructions for implementing a DSRM 406 for automatically checking the implementation of the design systems/tool kits in application development as disclosed herein. The DSRD 402 may also include a medium reader (e.g., a medium reader 112 as illustrated in FIG. 1) which may be configured to read any one or more sets of instructions, e.g., software, from any of the memories described herein. The instructions, when executed by a processor embedded within the DSRM 406, 506 or within the DSRD 402, may be used to perform one or more of the methods and processes as described herein. In a particular embodiment, the instructions may reside completely, or at least partially, within the memory 106, the medium reader 112, and/or the processor 104 (see FIG. 1) during execution by the DSRD 402.

According to exemplary embodiments, the instructions, when executed, may cause a processor 104 embedded within the DSRM 406 or the DSRD 402 to perform the following: accessing a database that stores statistical data corresponding to implementing a new application or feature enhancement into a current application; scanning an endpoint and collect corresponding statistical data from the database; generating feedback data based on the collected corresponding statistical data regarding implementing the new application or feature enhancement into a current application; creating a machine learning model configured to be trained to output decision data based on the generated feedback data; training the machine learning model with the decision data; and generating a score by utilizing the trained machine learning model, wherein the score is a value that is compared with a predetermined threshold value to determine a degree of readiness to implement the new application or to implement the feature enhancement into the current application.

According to exemplary embodiments, the instructions, when executed, may further cause the processor 104 to perform the following: generating the score for implementation of the current application based on the application's implementation of the accessibility requirements.

According to exemplary embodiments, the instructions, when executed, may further cause the processor 104 to perform the following: implementing a browse function configured to point to said endpoint to scan for the toolkit versioning data utilized to develop the new application or to implement the feature enhancement into the current application.

According to exemplary embodiments, the instructions, when executed, may further cause the processor 104 to perform the following: implementing the browse function to point tools at a corresponding library; scanning source codes, by utilizing a tool, from the library associated with the development of the new application or the feature enhancement into the current application; comparing the scanned source codes against rules or success criteria that have been loaded into the tool; and growing the criteria through implementing the machine learning model to account for more matches.

According to exemplary embodiments, the instructions, when executed, may further cause the processor 104 to perform the following: generating a weighted value of the score based on factors of toolkit usage and versioning, framework versioning and components' implementation.

According to exemplary embodiments, for any score that is below the predetermined threshold value and requiring fixing, the instructions, when executed, may further cause the processor 104 to perform the following: highlighting the problem areas associated with the development of the new application or the feature enhancement into the current application with a recommendation on how to fix the score.

According to exemplary embodiments, the instructions, when executed, may further cause the processor 104 to perform the following: calling out the toolkit, framework, accessibility requirements, and components that is not meeting the predetermined threshold value corresponding to a predefined production or deployment success criteria.

According to exemplary embodiments, the instructions, when executed, may further cause the processor 104 to perform the following: fixing the highlighted problem areas; and rescanning the endpoint to obtain an approved score that meets the predetermined threshold value.

According to exemplary embodiments, for any score that is equal to or above the predetermined threshold value, the instructions, when executed, may further cause the processor 104 to perform the following: highlighting additional recommendations to improve the score and make additional changes to the new application or the feature enhancement into the current application to improve performance.

According to exemplary embodiments as disclosed above in FIGS. 1-5, technical improvements effected by the instant disclosure may include a platform for implementing a platform and language agnostic design system review module configured to check the implementation of the design systems/tool kits in application development, but the disclosure is not limited thereto. For example, today, there appears to be many deliveries of applications that are not using the libraries correctly or not using the libraries at all. Also, there appears to be no way to track consistency in applications in production today which may lead to developers having no true guardrails on what is being released into production. According to exemplary embodiments as disclosed above in FIGS. 1-5, technical improvements effected by the instant disclosure may include a platform for implementing a platform and language agnostic design system review module configured to develop applications may prove to be more compliant from an accessibility perspective (i.e., enabling as many users as possible to use development sites (i.e., Web sites) in application developments, even when those users' abilities are limited in some way), and have more consistency throughout applications to ensure a more consistent ecosystem across technological field (i.e., LOB), but the disclosure is not limited thereto.

According to exemplary embodiments as disclosed above in FIGS. 1-5, technical improvements effected by the instant disclosure may include a platform for implementing a platform and language agnostic design system review module that may relate to a UI usage of UI frameworks, accessibility, and design system libraries for implementing an application utilizing advanced UI technologies and Web Content Accessibility Guidelines (WCAG) 2.1 accessibility baseline.

According to exemplary embodiments as disclosed above in FIGS. 1-5, technical improvements effected by the instant disclosure may include a platform for implementing a platform and language agnostic design system review module that may be configured to obtain feedback data regarding implementing a new application or feature enhancement into a current application, thereby improving functionality, consistency, efficiency (via support and maintenance) and accessibility of the application to its surrounding ecosystem, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for implementing a design system review tool by utilizing one or more processors along with allocated memory, the method comprising:
    accessing a database that stores statistical data corresponding to implementing a new application or feature enhancement into a current application;
    scanning an endpoint and collect corresponding statistical data from the database;
    generating feedback data based on the collected corresponding statistical data regarding implementing the new application or feature enhancement into a current application;
    creating a machine learning model configured to be trained to output decision data based on the generated feedback data;
    training the machine learning model with the decision data; and
    generating a score by utilizing the trained machine learning model, wherein the score is a value that is compared with a predetermined threshold value to determine a degree of readiness to implement the new application or to implement the feature enhancement into the current application,
    wherein the matrix data includes data corresponding to components used data, frameworks implementation efforts data and toolkit versioning data, and the method further comprising:
    implementing a browse function configured to point to said endpoint to scan for the toolkit versioning data utilized to develop the new application or to implement the feature enhancement into the current application;
    implementing the browse function to point tools at a corresponding library;
    scanning source codes, by utilizing a tool, from the library associated with the development of the new application or the feature enhancement into the current application;
    comparing the scanned source codes against rules or success criteria that have been loaded into the tool; and
    growing the criteria through implementing the machine learning model to account for more matches.

2. The method according to claim 1, wherein the statistical data includes one or more of the following data: lines of code, frameworks, number of components used, and accessibility requirements.

3. The method according to claim 2, further comprising:
    generating the score for implementation of the current application based on the application's implementation of the accessibility requirements.

4. The method according to claim 1, wherein the endpoint is a computing device utilized by a user of the new application or the current application.

5. The method according to claim 1, further comprising:
    generating a weighted value of the score based on factors of toolkit usage and versioning, framework versioning and components' implementation.

6. The method according to claim 5, wherein for any score that is below the predetermined threshold value and requiring fixing, the method further comprising:
    highlighting the problem areas associated with the development of the new application or the feature enhancement into the current application with a recommendation on how to fix the score.

7. The method according to claim 6, further comprising:
    calling out the toolkit, framework, accessibility requirements, and components that is not meeting the predetermined threshold value corresponding to a predefined production or deployment success criteria.

8. The method according to claim 6, for further comprising:
    fixing the highlighted problem areas; and
    rescanning the endpoint to obtain an approved score that meets the predetermined threshold value.

9. The method according to claim 5, wherein for any score that is equal to or above the predetermined threshold value, the method further comprising:
highlighting additional recommendations to improve the score and make additional changes to the new application or the feature enhancement into the current application to improve performance.

10. A system for implementing a design system review, the system comprising:
a processor; and
a memory operatively connected to the processor via a communication interface, the memory storing computer readable instructions, when executed, causes the processor to:
access a database that stores statistical data corresponding to implementing a new application or feature enhancement into a current application;
scan an endpoint and collect corresponding statistical data from the database;
generate feedback data based on the collected corresponding statistical data regarding implementing the new application or feature enhancement into a current application;
create a machine learning model configured to be trained to output decision data based on the generated feedback data;
train the machine learning model with the decision data; and
generate a score by utilizing the trained machine learning model, wherein the score is a value that is compared with a predetermined threshold value to determine a degree of readiness to implement the new application or to implement the feature enhancement into the current application,
wherein the matrix data includes data corresponding to components used data, frameworks implementation efforts data and toolkit versioning data, wherein the processor is further configured to:
implement a browse function configured to point to said endpoint to scan for the toolkit versioning data utilized to develop the new application or to implement the feature enhancement into the current application;
implement the browse function to point tools at a corresponding library;
scan source codes, by utilizing a tool, from the library associated with the development of the new application or the feature enhancement into the current application;
compare the scanned source codes against rules or success criteria that have been loaded into the tool; and
grow the criteria through implementing the machine learning model to account for more matches.

11. The system according to claim 10, wherein the statistical data includes one or more of the following data: lines of code, frameworks, number of components used, and accessibility requirements.

12. The system according to claim 11, wherein the processor is further configured to:
generate the score for implementation of the current application based on the application's implementation of the accessibility requirements.

13. The system according to claim 10, wherein the endpoint is a computing device utilized by a user of the new application or the current application.

14. A non-transitory computer readable medium configured to store instructions for implementing a design system review tool, the instructions cause a processor to perform the following:
accessing a database that stores statistical data corresponding to implementing a new application or feature enhancement into a current application;
scanning an endpoint and collect corresponding statistical data from the database;
generating feedback data based on the collected corresponding statistical data regarding implementing the new application or feature enhancement into a current application;
creating a machine learning model configured to be trained to output decision data based on the generated feedback data;
training the machine learning model with the decision data; and
generating a score by utilizing the trained machine learning model, wherein the score is a value that is compared with a predetermined threshold value to determine a degree of readiness to implement the new application or to implement the feature enhancement into the current application,
wherein the matrix data includes data corresponding to components used data, frameworks implementation efforts data and toolkit versioning data, and wherein the instructions, when executed, further cause the processor to perform the following:
implementing a browse function configured to point to said endpoint to scan for the toolkit versioning data utilized to develop the new application or to implement the feature enhancement into the current application;
implementing the browse function to point tools at a corresponding library;
scanning source codes, by utilizing a tool, from the library associated with the development of the new application or the feature enhancement into the current application;
comparing the scanned source codes against rules or success criteria that have been loaded into the tool; and
growing the criteria through implementing the machine learning model to account for more matches.

15. The non-transitory computer readable medium according to claim 14, wherein the statistical data includes one or more of the following data: lines of code, frameworks, number of components used, and accessibility requirements, and
wherein the instructions, when executed, cause the processor to further perform the following:
generating the score for implementation of the current application based on the application's implementation of the accessibility requirements.

16. The non-transitory computer readable medium according to claim 14, wherein the instructions, when executed, cause the processor to further perform the following:
generating a weighted value of the score based on factors of toolkit usage and versioning, framework versioning and components' implementation.

17. The non-transitory computer readable medium according to claim 16, wherein for any score that is below the predetermined threshold value and requiring fixing, and wherein the instructions, when executed, cause the processor to further perform the following:
highlighting the problem areas associated with the development of the new application or the feature enhancement into the current application with a recommendation on how to fix the score.

18. The non-transitory computer readable medium according to claim 17, wherein the instructions, when executed, cause the processor to further perform the following:
- calling out the toolkit, framework, accessibility requirements, and components that is not meeting the predetermined threshold value corresponding to a predefined production or deployment success criteria.

19. The non-transitory computer readable medium according to claim 17, wherein the instructions, when executed, cause the processor to further perform the following:
- fixing the highlighted problem areas; and
- rescanning the endpoint to obtain an approved score that meets the predetermined threshold value.

20. The non-transitory computer readable medium according to claim 16, wherein for any score that is equal to or above the predetermined threshold value, and wherein the instructions, when executed, cause the processor to further perform the following:
- highlighting additional recommendations to improve the score and make additional changes to the new application or the feature enhancement into the current application to improve performance.

* * * * *